(12) United States Patent
Chung et al.

(10) Patent No.: US 10,531,146 B2
(45) Date of Patent: Jan. 7, 2020

(54) LEAN PRIVATE COPY OF MEDIA CONTENT WITHIN NETWORK-BASED DIGITAL VIDEO RECORDINGS

(71) Applicant: MobiTV, Inc., Emeryville, CA (US)

(72) Inventors: Do Hyun Chung, San Ramon, CA (US); Catherine Cho, Davis, CA (US)

(73) Assignee: MobiTV, Inc., Emeryville, CA (US)

( * ) Notice: Subject to any disclaimer, the term of this patent is extended or adjusted under 35 U.S.C. 154(b) by 0 days.

(21) Appl. No.: 15/612,780

(22) Filed: Jun. 2, 2017

(65) Prior Publication Data
US 2018/0352288 A1 Dec. 6, 2018

(51) Int. Cl.

| | |
|---|---|
| H04N 7/173 | (2011.01) |
| H04N 21/433 | (2011.01) |
| H04N 21/472 | (2011.01) |
| H04N 21/437 | (2011.01) |
| H04N 21/258 | (2011.01) |
| H04N 21/254 | (2011.01) |

(Continued)

(52) U.S. Cl.
CPC ..... *H04N 21/4334* (2013.01); *H04L 65/4084* (2013.01); *H04L 65/605* (2013.01); *H04N 21/2541* (2013.01); *H04N 21/25816* (2013.01); *H04N 21/437* (2013.01); *H04N 21/47202* (2013.01); *H04N 21/835* (2013.01); *H04N 21/8456* (2013.01); *H04N 21/2187* (2013.01)

(58) Field of Classification Search
CPC .......... H04N 21/4147; H04N 21/4334; H04N 21/2747; H04N 21/47202; H04N 21/2181; H04N 21/2343; H04N 21/23439
See application file for complete search history.

(56) References Cited

U.S. PATENT DOCUMENTS

| 9,049,484 B2 | 6/2015 | Major et al. |
| 2003/0095791 A1 | 5/2003 | Barton et al. |

(Continued)

FOREIGN PATENT DOCUMENTS

| WO | 2003065731 A1 | 8/2003 |

OTHER PUBLICATIONS

"Storage Orchestration for Unlimited Cloud-DVR Capacity", Imagine Communications Copyright 2015, Frisco, TX USA, WP_StorageOrch_1115, http://www.imaginecommunications.com/sites/default/files/3685_wp_storage_orchestration_0.pdf, downloaded Oct. 16, 2018. 16 pages.

(Continued)

*Primary Examiner* — Jason P Salce
(74) *Attorney, Agent, or Firm* — Kwan & Olynick LLP

(57) ABSTRACT

Described herein are techniques and mechanisms for providing a lean private copy of media content. According to various embodiments, a private copy of a media content item may be made specific to a user account. For example, to use a private copy of a media content item to present that media content item, a client machine may need to first perform operations such as account authentication, content licensing, and device-based DRM. The private copy of the media content item may be significantly deduplicated such that the actual size on disk of the private copy is small relative to the size of the uncompressed media content item. The private copy of the media content item may include reference information which maps the user account associated with the copy to data files associated with the recording.

20 Claims, 7 Drawing Sheets

(51) Int. Cl.
*H04L 29/06* (2006.01)
*H04N 21/835* (2011.01)
*H04N 21/845* (2011.01)
*H04N 21/2187* (2011.01)

(56) References Cited

U.S. PATENT DOCUMENTS

| | | |
|---|---|---|
| 2012/0210382 A1 | 8/2012 | Walker et al. |
| 2014/0082124 A1* | 3/2014 | van Coppenolle ............... H04L 67/2842 709/213 |
| 2014/0165116 A1 | 6/2014 | Major et al. |
| 2015/0242500 A1 | 8/2015 | Walker et al. |
| 2017/0105036 A1* | 4/2017 | Viveganandhan ............... H04N 21/2747 |
| 2017/0123713 A1* | 5/2017 | Fisher .................. G06F 3/064 |
| 2017/0188054 A1* | 6/2017 | Ma ...................... H04L 67/2814 |
| 2017/0302981 A1* | 10/2017 | Sethuraman ....... H04N 21/2662 |
| 2018/0124445 A1* | 5/2018 | Beili ................. H04N 21/274 |
| 2018/0137208 A1* | 5/2018 | Ricker ............... G06F 9/4881 |

OTHER PUBLICATIONS

Mestric, Roland, "Is network DVR ready for prime time?", Nokia Blog, Home page, Roland Mestric, Oct. 10, 2014. Copyright 2018., Downloaded Oct. 16, 2018, https://www.nokia.com/en_int/blog/network-dvr-ready-prime-time, Oct. 10, 2014, 6 pages.

Moulding, John, "Single-copy nDVR without the storage headaches and high costs", Videonet, Sep. 18, 2014. Downloaded Oct. 16, 2018., http://v-net.tv/2014/09/18/single-copy-ndvr-without-the-storage-headaches-and-high-costs/, Sep. 18, 2014, 4 pages.

\* cited by examiner

LEAN PRIVATE COPY OF MEDIA CONTENT WITHIN NETWORK-BASED DIGITAL VIDEO RECORDINGS

TECHNICAL FIELD

The present disclosure relates to the creation and storing of private copies of media content for presentation on content playback devices.

DESCRIPTION OF RELATED ART

End users often subscribe to content services that include live content streams. These users often prefer to watch content at a time that is later than that when the content was originally presented. Accordingly, users commonly employ digital video recording (DVR) devices or services to record content for later presentation. One approach to DVR is to maintain a physical device with content storage capabilities on the user's premises. However, such DVR devices suffer from numerous drawbacks, such as expense and lack of storage space. Accordingly, many users employ a DVR service that records content off of the user's premises and then provides the recorded content to the user on demand.

In many configurations, a DVR service provider is different from the source of a live content stream. For instance, a DVR service provider may provide DVR services for live content streams generated by a variety of television networks or other such content sources. In some jurisdictions, when multiple users request to record the same content item, some courts have held that copyright law requires a DVR service provider to maintain a private copy of the recorded content item for each user rather than to maintain a single copy of the recorded content item for all users. However, maintaining separate copies of a single content item for many different users imposes a substantial burden on DVR service providers. Accordingly, improved techniques for providing private copies of recorded media content items are desired.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
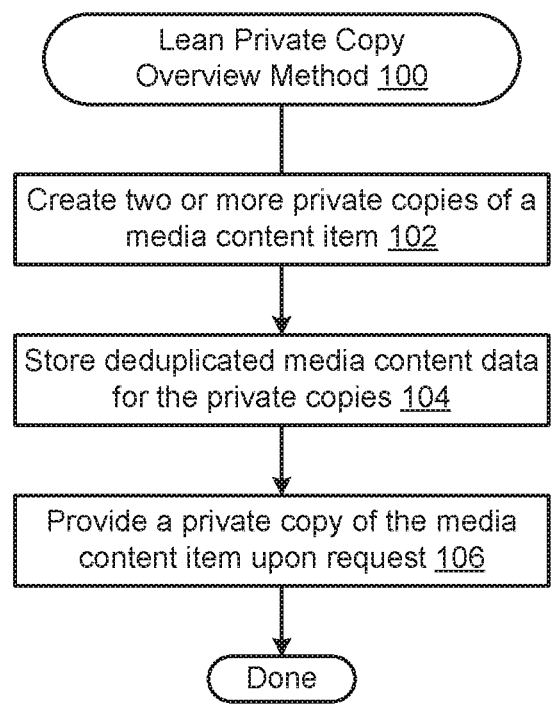
FIG. 1 illustrates an example of an overview method for providing a lean private copy that can be used with various techniques and mechanisms of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fragments, particular servers and encoding mechanisms. However, it should be noted that the techniques of the present invention apply to a wide variety of different fragments, segments, servers and encoding mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Private copies of media content items may be created for later presentation at client machines. A private copy of a media content item may be made specific to a user account through the use of encryption technology and digital rights management. For example, to use a private copy of a media content item to present that media content item, a client machine may need to first perform operations such as authenticating a user account and retrieving a content license. The private copy of the media content item may be significantly deduplicated such that the actual size on disk of the private copy is small relative to the size of the uncompressed media content item. However, the private copy of the media content item may include references that allow the necessary data to be retrieved (e.g., from a media library or deduplication repository) with appropriate authentication and/or verification procedures.

Example Embodiments

According to various embodiments, users may receive content from a content management service. The content management service may facilitate the interaction of users with various types of content services. For instance, the content management service may provide a user interface for managing and accessing content from a number of different content sources. The interface may display content received live via a cable or satellite television connection, one or more on-demand-video service providers such as Netflix or Amazon, and content accessible on local or network storage locations. In addition, the interface may be used to access this content on any number of content playback devices.

End users often subscribe to content services that include live content streams, and many users employ a DVR service that records content off of the user's premises and then provides the recorded content to the user on demand. In some jurisdictions, when multiple users request to record the same content item, some courts have held that copyright law requires a DVR service provider to maintain a private copy of the recorded content item for each user rather than to maintain a single copy of the recorded content item for all users.

Maintaining separate copies of a single content item for many different users requires substantial storage space, which can present prohibitive technological obstacles. For example, if 1,000,000 users request to record a popular sporting event that requires 1,000 MB to store on disk, the total storage space required would total 1 petabyte. In addition, maintaining separate copies of a single content item conflicts with standard approaches to content streaming, which typically involve caching frequently and/or recently requested content in a cache server equipped to quickly provide the content to different client machines. Caching content in this way is typically much faster than retrieving content from the type of bulk storage infrastructure typically involved in storing large scale (e.g., petabyte) data.

According to various embodiments, techniques and mechanisms described herein provide for creating and transmitting a lean private copy of a media content item that is specific to a particular user account while at the same time requiring substantially less storage space than an uncompressed copy. In particular embodiments, a lean private copy of a media content item may employ digital rights management, encryption, and/or authentication technologies to ensure its specificity. That is, a user having possession of the lean private copy could not employ the lean private copy to present the media content without first authenticating as the user account linked with the lean private copy.

In some implementations, a lean private copy of a media content item may include references to data segments that include media content associated with the media content item. In a typical lean private copy, each data segment may be small in comparison to the overall size of the uncompressed media content item. Further, data segments may be deduplicated in the sense that although different lean private copies may include references to the same data segment, the service provider need not store a separate copy of the data segment for each lean private copy that refers to it. As used herein, the term "lean private copy" refers to a copy of a media content item that is both specific to a particular content management account and that includes references to one or more deduplicated data segments.

In particular embodiments, a lean private copy stored and transmitted as described herein may also allow a service provider to employ content caching. For example, when a client machine requests a particular data segment, the data segment may be stored in a caching system so that a subsequent request by a different client machine may be served by the caching system rather than by a more permanent large-scale storage system.

According to various embodiments, the content management service may receive content from various sources, such as content service providers. Then, the content management service may transcode the content for transmission to client machines. Content transcoding refers to any process for changing data encoded in one format to data encoded in a different format. In particular embodiments, transcoding may involve a lossy process that introduces generation loss into the resulting content encoding. Alternately, or additionally, transcoding may involve a lossless process such as lossless compression or decompression.

According to various embodiments, content sent from a service provider to client machines may be transcoded into various encoding formats for a variety of reasons. For instance, the content may be transcoded so that content may be transmitted to client devices that do not support the original format or that have a relatively limited storage capacity that can better handle a reduced file size. For instance, Cineon and DPX files have been widely used as a common format for digital cinema, but the data size of a two-hour movie is about 8 terabytes, which is much too large for streaming over currently available networks to modern content playback devices. In some instances, a transcoded encoding may be encoded in a screen resolution smaller than that of the original encoding. For instance, the source encoding may be encoded at a relatively high resolution, while the transcoded encoding may be presented in a significantly smaller resolution.

In particular embodiments, techniques and mechanisms described herein may be used for HTTP Live Streaming (HLS) and Dynamic Adaptive Streaming over HTTP (DASH), and any other ABR (Adaptive Bitrate) streaming technologies. However, the techniques and mechanisms are generally applicable to a wide range of video content technologies.

In some implementations, a media content item may be transcoded into different encoding formats, quality levels, or bit rates. Further, an encoding of a media content item may be divided into time periods. Thus, a lean private copy of a media content item may include references to different data segments for the same period of time, where the different data segments are encoded differently. In this way, a client machine seeking to present the media content item may request a data segment appropriate to the situation. For example, a mobile phone and a personal computer may both employ the same lean private copy of a media content item to present the media content item provided that each device performs the appropriate authentication procedures associated with the content management account linked to the lean private copy. However, a mobile phone on a cellular network having a lean copy of the media content item may request lower quality data segments than a personal computer having the same lean copy of the media content item on a high-speed wired network.

In particular embodiments, different user accounts may be licensed to view the same media content item at different levels of quality. In this case, a lean private copy of the media content item may reflect a licensed quality level. For example, a lean private copy associated with a user account licensed to view the media content at a particular quality level may only include references to data segments that do not exceed the licensed quality level.

Figure 2:
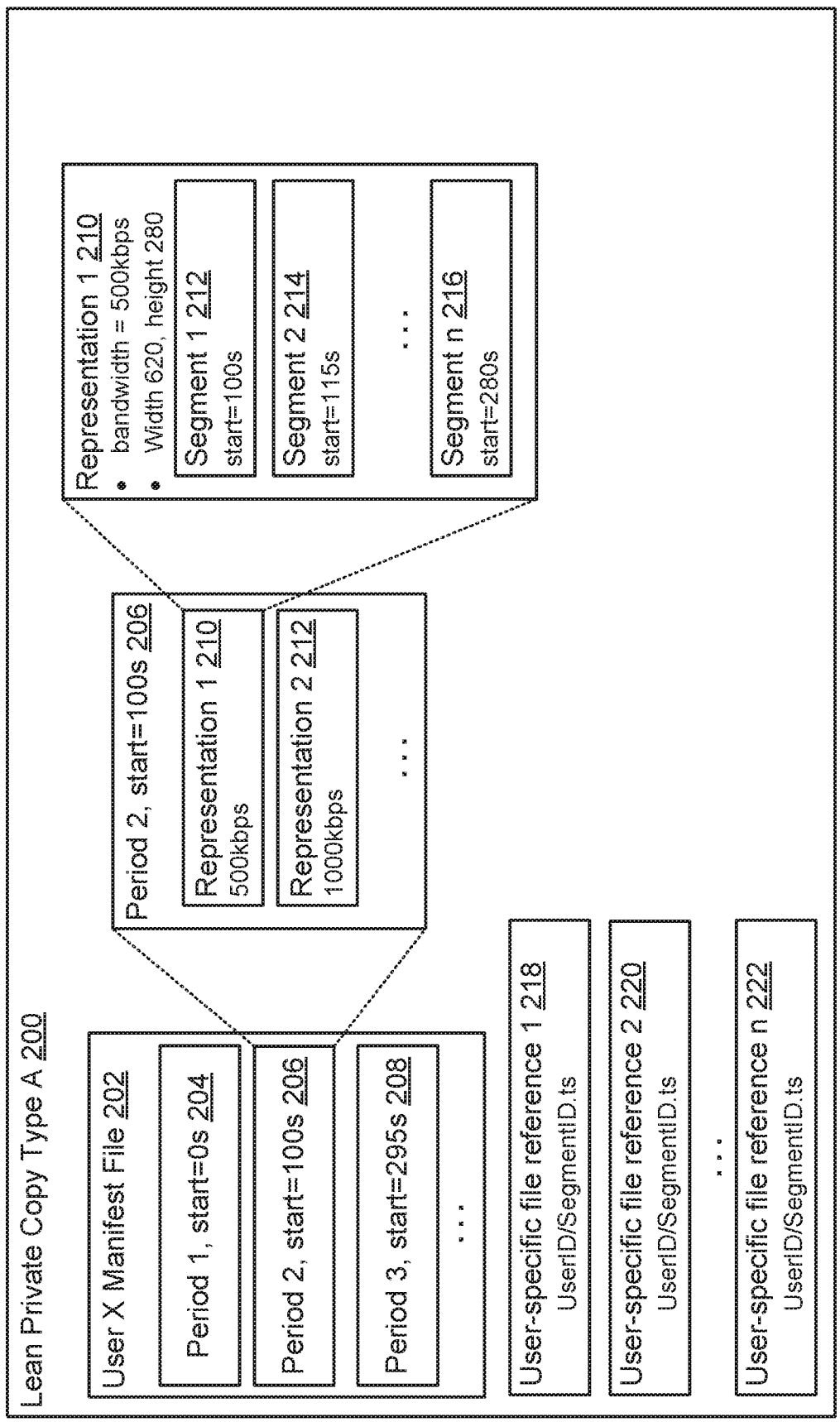
FIG. 2 illustrates one example of a lean private copy associated with a particular user account that may be generated in accordance with techniques and mechanisms described herein.
Figure 3:
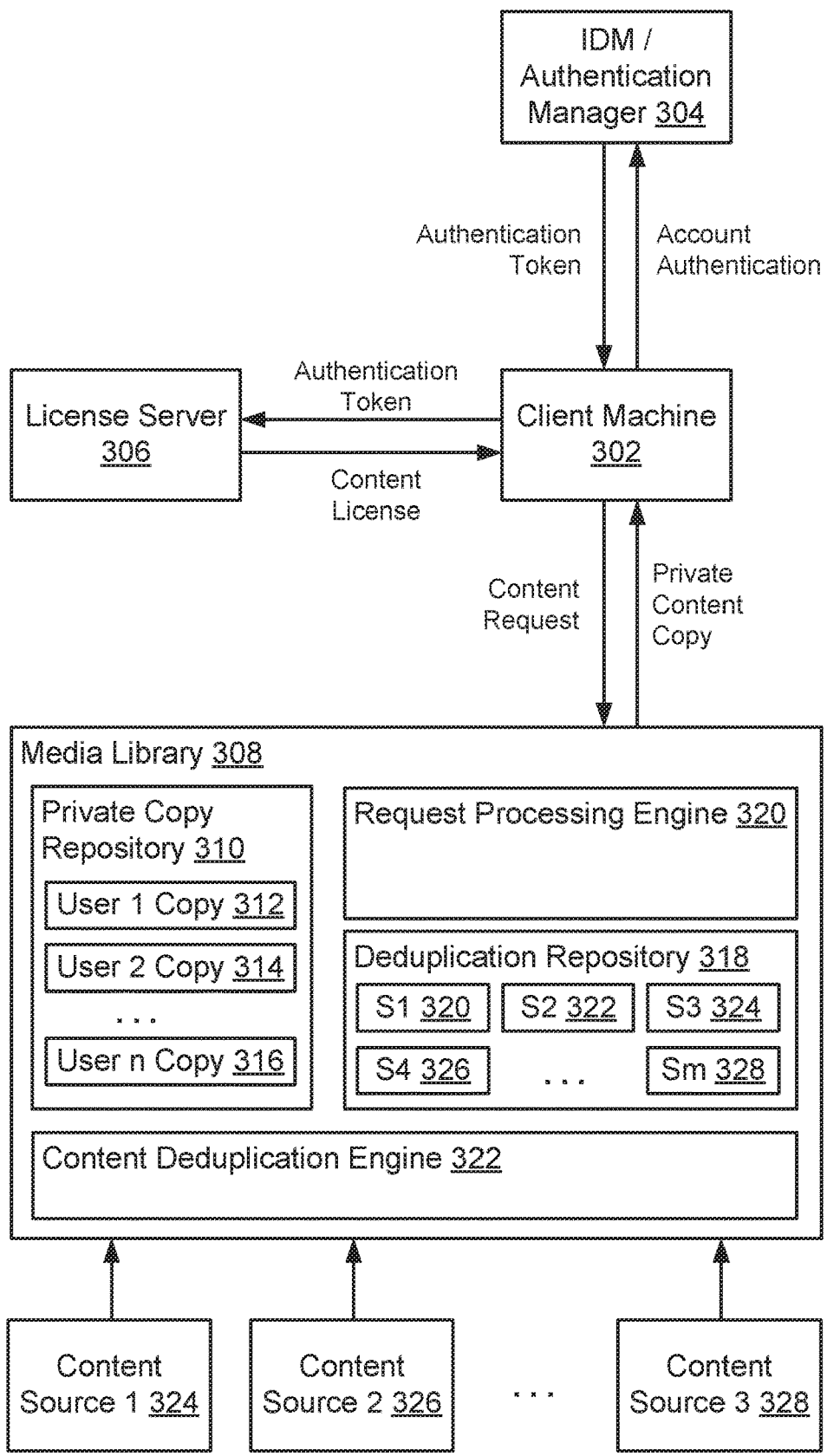
FIG. 3 illustrates an example of a system that may be used to create and retrieve a lean private copy that can be used in conjunction with various techniques and mechanisms of the present invention.

FIG. 1 illustrates an example of an overview method 100 for providing a lean private copy that can be used with various techniques and mechanisms of the present invention. An example of a lean private copy configured in accordance with one or more implementations is shown in FIG. 2. According to various embodiments, the method may be performed at a content management system, components of which are shown in FIG. 3.

At 102, two or more private copies of a media content item are created. According to various embodiments, creating a private copy of a media content item may involve operations such as providing a user-specific manifest file that is made unique to a content management account via selective media data reference inclusion, digital rights management enforcement, account authentication, and/or data encryption procedures. Techniques for creating a lean private copy are discussed in additional detail with respect to FIG. 4.

At 104, deduplicated media content data is stored for the private copy. According to various embodiments, storing deduplicated media content data may involve operations such as receiving media content information from a remote source, dividing the media content item into periods of time, transcoding raw media content information into one or more encoding formats, and/or storing encoded media content data in a retrievable fashion. Techniques for storing deduplicated media content data are discussed in additional detail with respect to FIG. 4.

At 106, a private copy of the media content item is provided upon request. According to various embodiments, providing a private copy of the media content item may involve operations such as authenticating a client machine as being associated with a user account, providing a content license for a media content item, providing the lean private copy to the client machine, and/or transmitting deduplicated media segments to the client machine as necessary for re-inflating the private copy. Techniques for providing a private copy of a media content item are discussed in additional detail with respect to FIG. 5.

FIG. 2 illustrates one example of a lean private copy type A 200 associated with a particular content management account that may be generated in accordance with techniques and mechanisms described herein. According to various embodiments, the lean private copy 200 may represent one or more media content items that have been recorded for later presentation by a particular user. As is discussed herein, the lean private copy type A 200 is specific to a particular content management account. Further, the lean private copy type A 200 is only one type of a lean private copy that may be provided in accordance with techniques and mechanisms described herein. Another example of a lean private copy is discussed with respect to FIG. 7.

In some implementations, the lean private copy 200 includes a user-specific manifest file 202. A media content item may be logically divided into a number of periods. Each of those periods may be associated with a period description entry, such as the period description entries 204, 206, and 208 shown in FIG. 2. The lean private copy 200 also includes user-specific file references 218, 220, and 222.

In particular embodiments, different periods may span different lengths of time. Alternately, each period may span the same length of time. The length of time associated with a period may be selected in any of various ways. For example, period length may be selected to reflect the tradeoff between the number of data segment requests and the ability to initiate content playback in a timely fashion. By dividing the media content item into more data segments, playback may be initiated more quickly. However, by dividing the media content item into fewer data segments, a client device may need to make fewer distinct requests for data segments. In some systems, data segments may average 10 to 15 seconds in length. However, depending on various considerations, segments may be anywhere from less than one second to more than a minute in length.

In sonic embodiments, a period description entry may provide information about one or more representations of the period of time associated with the period entry. For example, media data for a particular time period may be available at different bit rates to accommodate different user preferences, device capabilities, network features, bandwidth limitations, or other such characteristics of a particular streaming situation. For instance, in the example lean private copy 200 shown in FIG. 2, the period 2 entry 206 is associated with a representation 210 encoded at 500 kbps and a representation 212 encoded at 1000 kbps.

In particular embodiments, the same set of representation characteristics may be available for each period. Alternately, different periods may be associated with different types of representations. For instance, a media presentation period associated with content such as the credits for a movie may be associated with fewer and/or lower quality representations, while a media presentation period associated with high-information content such as fast-paced action may be associated with more and/or higher quality representations.

According to various embodiments, each representation may be associated with some number of data segment references. For example, the representation 210 shown in FIG. 2 is associated with data segment 1 reference 212, data segment 2 reference 214, and data segment n reference 216. Each data segment reference may correspond to a particular period of time within the period of time represented by the associated reference. For example, the representation 1 210 is associated with the period 2 entry 2016, which spans the period from 100 seconds to 295 seconds of the content represented by the media presentation 202. Within the representation 1 210, the segment 1 reference 212 spans the period from 100 seconds to 115 seconds. As with the period entries, the segments referred to by the segment references may all be the same length or may be of different lengths.

In some implementations, each data segment reference may include information for retrieving a particular data segment from a media library. For instance, a data segment reference may include a uniform resource identifier (URI), segment identifier, or other such information that, when provided to the media library, causes the media. library to return the requested segment. In this way, the lean private copy 200 may be used by a client machine to present the media content item at the client machine.

In particular embodiments, a lean private copy is specific to a particular content management account. For example, the lean private copy type A 200 shown in FIG. 2 includes user-specific file references 218, 220, and 222. Each of these file references is a user-specific link to a particular data segment. For example, the user-specific file reference 2 includes a local file path that itself includes several different components. According to various embodiments, these components include a user identifier, a segment identifier, and a file extension.

In some implementations, each user-specific file reference corresponds with a particular segment. For example, the user-specific file reference 2 220 corresponds with the segment 2 214. Which is the second segment in the 500 kbps representation 1 210 associated with the period 2 206 in the media presentation 202.

In some embodiments, a user-specific file reference provides a user-specific link to a data segment that may be retrieved from a media library. For example, the actual data included in the segment corresponding with the user-specific file reference 2 220 may be stored on a server in a deduplicated fashion. Then, the user-specific file reference 2 220 may be used to retrieve the data segment for playback from the local file system when the data segment corresponding with the file reference is retrieved from the media library.

FIG. 3 illustrates an example of a system 300 that may be used to create and retrieve a lean private copy that can be used in conjunction with various techniques and mechanisms of the present invention. The system 300 includes a client machine 302, an IDM/authentication manager 304, an license server 306, a media library 308, and content sources 324, 326, and 328. The media library 308 includes a private copy repository 310, which includes private copies 312, 314, 316. The media library 308 also includes a request processing engine 320 and a deduplication repository 318, which includes data segments 320, 322, 324, 326, and 328. These components are described in further detail with reference to the methods shown in FIGS. 4 and 5.

According to various embodiments, the components shown in FIG. 3 may be implementing via some combination of hardware and software. For example, the media library 308 may include one or more of each of storage devices, processors, communications interfaces, and memory banks. In some configurations, a single component such as a request processing engine 320 may include potentially many different physical devices. Alternately, or additionally, some components, such as the private copy repository 310 and the deduplication repository 318, may have one or more physical devices in common.

Figure 4:
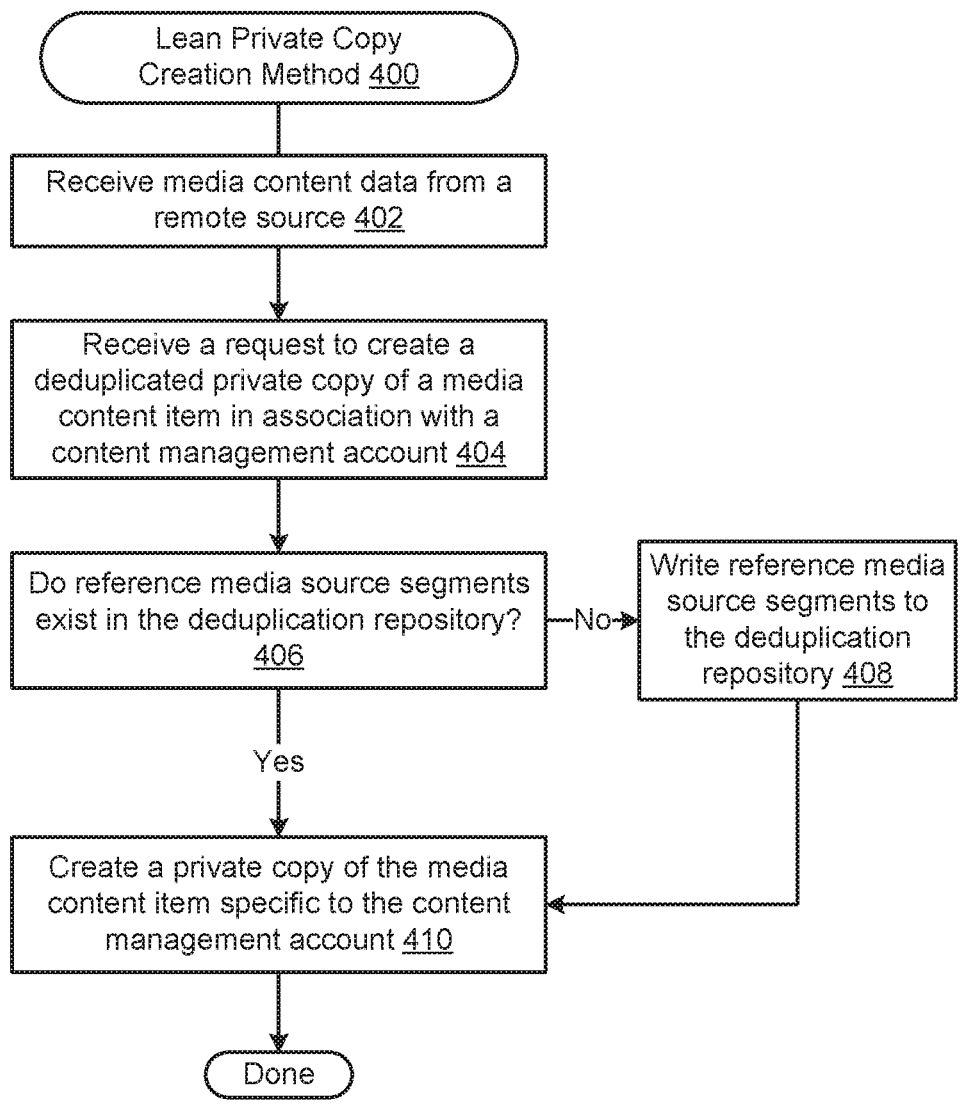
FIG. 4 illustrates one example of a method for creating a lean private copy.

FIG. 4 illustrates one example of a method 400 for creating a lean private copy. For instance, the method 400 may be performed in order to create a private copy such as the copy 312 shown in FIG. 3. According to various embodiments, the method 400 may be performed in conjunction with one or more of the computing components shown in FIG. 3.

At 402, media content data is received from a remote source. According to various embodiments, a media system may receive media content from any of a variety of remote sources. Although only three sources are shown in FIG. 3, a media system may receive media content from potentially hundreds or thousands of different sources. These sources may include, but are not limited to: broadcast television networks, cable television networks, premium content networks, or internet-based content providers (e.g., Netflix, Hulu, YouTube, etc.).

In particular embodiments, a content source may provide content in a live streaming format. For example, a broadcast or cable television network typically provides content on a channel on which one content item is presented at a time in a live-streaming fashion. In some configurations, the service provider associated with the media library 308 may be responsible for providing such live streaming content directly to a client machine. Alternately, a client machine may receive live streaming content from a different source (e.g., a broadcast antenna) and employ the service provider for DVR services.

At 404, a request is received to create a private copy of a media content item in association with a content management account. In some embodiments, the request may be received from a client machine, such as the client machine 302 shown in FIG. 3. The request may be provided through a web browser, a set top box, a mobile device, or any other suitable mechanism. The request may indicate one or more media content items to record. Alternately, or additionally, the request may indicate a time to start recording and a time to stop recording a particular live-streaming content channel.

As will be discussed with respect to FIG. 4, the client machine may perform one or more authentication operations so that the request is associated with a particular content management account. For instance, the client machine may provide a username, password, certificate, token, or other such information to confirm an identity.

In particular embodiments, a request to create a private copy may be scheduled in advance, for instance when requesting to record a live-streaming content item. Scheduling the private copy operation may involve operations such as creating or modifying an entry in a database or other bookkeeping mechanism. The entry may indicate information such as the content management account associated with the request, a time the request was made, an identifier for the media content requested to be stored, and/or a time at which the media content item is to be recorded or received.

At 406, a determination is made as to whether reference media segments for the media content item are stored in the deduplication repository. According to various embodiments, the determination may be made by checking a database or other such tracking system to identify whether reference media segments are already present. If reference media segments are already present, then they need not be stored again.

At 408, reference media source segments are written to the deduplication repository. In the example shown in FIG. 3, content deduplication may be performed by the deduplication engine 322. The deduplication engine 322 may be responsible for receiving raw media content from content sources, such as the sources 324, 326, and 328 shown in FIG. 3. The deduplication engine 322 may process the raw media content for the creation of private copies stored in the private copy repository 310 as well as the deduplicated data segments stored in the deduplication repository 318.

According to various embodiments, storing deduplicated media content data may involve one or more operations for parsing raw media content data into a format suitable for referencing within a private copy. For example, a stream of raw media. content data may be divided into chunks corresponding to periods of time. Data chunks may then be transcoded into any of a variety of formats. Transcoded data for a data chunk may be stored as segments that each correspond to a shorter period of time within the time period associated with the data chunk.

In the example shown in FIG. 3, a single media content item is associated with "n" different deduplicated private user copies and "m" different data segments. However, a media system may store many different private user copies of many different media content items.

In some implementations, creating deduplicated data segments may involve, for instance, receiving raw media content data for the media content item from the content source 2 326. The raw media content data may then be divided into chunks, with a transcoding process producing one or more data segments for each of the chunks. The process of transcoding may occur more than once, producing more than one data segment for the same period of time, with different data segments having different characteristics e.g., bitrate, quality, etc.).

At 410, a private copy of the media content item is created that is specific to the content management account. According to various embodiments, creating each private copy may also involve constructing the types of information and references shown in FIG. 2 and FIG. 7. For example, the private copy may be created by constructing a manifest file as well as one or more user-specific references to data segments. The manifest file may include addresses for retrieving the data segments from the media library. The user-specific references may provide local file system links to the deduplicated data segments once they have been retrieved from the media library. The private copy may also be account-specific in the sense that it may only be used to retrieve the referenced data segment by a client device that has been authenticated in association with the content management account and that possesses a content license that provides permission to retrieve the referenced data segment.

Figure 5:
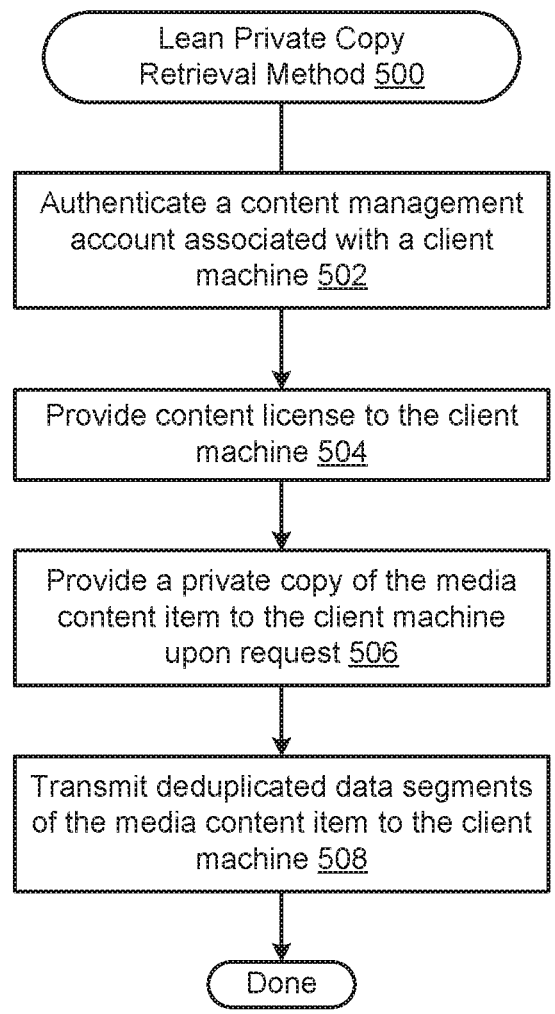
FIG. 5 illustrates one example of a method for retrieving a lean private copy.

FIG. 5 illustrates one example of a method 500 for retrieving a lean private copy. According to various embodiments, the method 500 may be performed in conjunction with one or more of the computing components shown in FIG. 3

At 502, a content management account associated with a client machine is authenticated. In the example configuration shown in FIG. 3, the client machine 302 may communicate with the identity manager (IDM)/authentication manager 304. This communication may involve transmitting information from the client machine to identify a content management account. According to various embodiments, such information may include, but is not limited to: a username, a password, an account number, a certificate, and/or a personal identification number (PIN). In some instances the IDM/authentication manager 304 may request additional information from the client machine 302 in order to complete authentication.

In some embodiments, account authentication may result in the IDM/Authentication manager 304 issuing an authentication token to the client machine 302. The client machine 302 may then use the authentication token to verify the identity of the content management account to other devices, such as the license server 306 and/or the media library 308.

At 504, a content license is provided to the client machine. According to various embodiments, providing a content license may involve an interaction between the client machine (e.g., the client machine 302) and a license server (e.g., the license server 306). In this interaction, the client machine may request a content license associated with a particular media content item, such as an item for which the client machine previously requested to create a private copy. The client machine may also provide authentication information such as an authentication token issued by the IDM/ authentication manager 304.

In some implementations, the license server may verify that the client machine is authorized to receive a license for the requested content. As part of this verification, the license server may verify the account associated with the client machine. For instance, the license server 306 shown in FIG. 3 may apply an encryption algorithm to an authentication token provided by the client machine to determine a content management account associated with the client machine.

In particular embodiments, the license server may compare the content management account associated with the license request to a database or other repository of license permission information. The license permission information may indicate which content a particular content management account is authorized to access. For example, a particular account may be authorized to access only content that does not exceed a particular quality level. As another example, a content management account may be authorized to access some live streaming channels but not others. As yet another example, a content management account may or may not be authorized to access individual (e.g., pay-per-view) content items.

According to various embodiments, when the license server determines that the content management account is authorized to access the requested content item, the license server may provide the content license to the client machine. The content license may take the form of a cryptographic token that is linked to the particular content management account. That is, the content license may authorize a specific content management account to retrieve a private copy of the requested media content item, but may not be used by other content management accounts to access the same media content item.

At 506, a private copy of the media content item is provided to the client machine upon request. According to various embodiments, the private copy may be provided by the request processing engine 320, which may be configured to respond to content requests from potentially many different client machines.

In particular embodiments, providing the private copy may involve first verifying that the user is authorized to receive the private copy. For instance, the client machine 302 may provide the content license to the request processing engine 320. The request processing engine 320 may then apply a cryptographic algorithm to the content license to ensure that the content license is valid and is associated with the content management account linked to the client machine 302 from which the request initiated.

According to various embodiments, when the request is determined to be valid, the request processing engine 320 may retrieve the appropriate private copy (e.g., user 2 copy 314) from the private copy repository (e.g., private copy repository 310). The private copy may then be transmitted to the client machine 302.

At 508, one or more deduplicated data segments of the media content item are transmitted to the client machine. In some implementations, the data segments may be explicitly requested by the client machine. For example, after the client machine has received the private copy, the client machine may then request specific data segments to re-inflate the private copy for presentation.

According to various embodiments, the client machine may request a specific data segments by providing a request to the request processing engine that includes an identifier associated with the data segment. For example, each data segment in the private copy may be associated with an identifier (e.g., a URI) that is specific to both the data segment and the client machine. To retrieve the data segment, the client machine may then need to establish a session with the request processing engine to verify the identity of the content management account. Within that session, the client machine may provide the identifier for the data segment to retrieve it.

In some implementations, the request processing engine 320 may respond to a valid request for a data segment by retrieving the requested data segment from the deduplication repository 318. The requested data segment may then be transmitted to the client machine 302. Once a requested data segment has been received by the client machine, the data segment may be used to facilitate the presentation of the media content item. For instance, the private copy may specify information such as an encoding for each data segment and an order in which data segments are to be presented.

In particular embodiments, a client machine may request different types of data segments at different points during the presentation of a media content item. For example, the client machine may initiate playback of a media content item by first requesting data segments encoded at a relatively lower quality or bitrate, which may facilitate fast receipt of the requested data segments and thus enable the client machine to quickly initiate playback. However, the client machine may also buffer data segments received from the media system and increase the quality of successive data segment requests as the buffer is filled. As another example, the client machine may transition from requesting relatively high-quality segments to requesting relatively low-quality segments if network speeds decay.

In particular embodiments, the system shown in FIG. 3 may include other components that do not appear in FIG. 3. For example, the media library 308 may include a caching system for caching recently or frequently retrieved data segments that are present in the deduplication repository 318.

Figure 6:
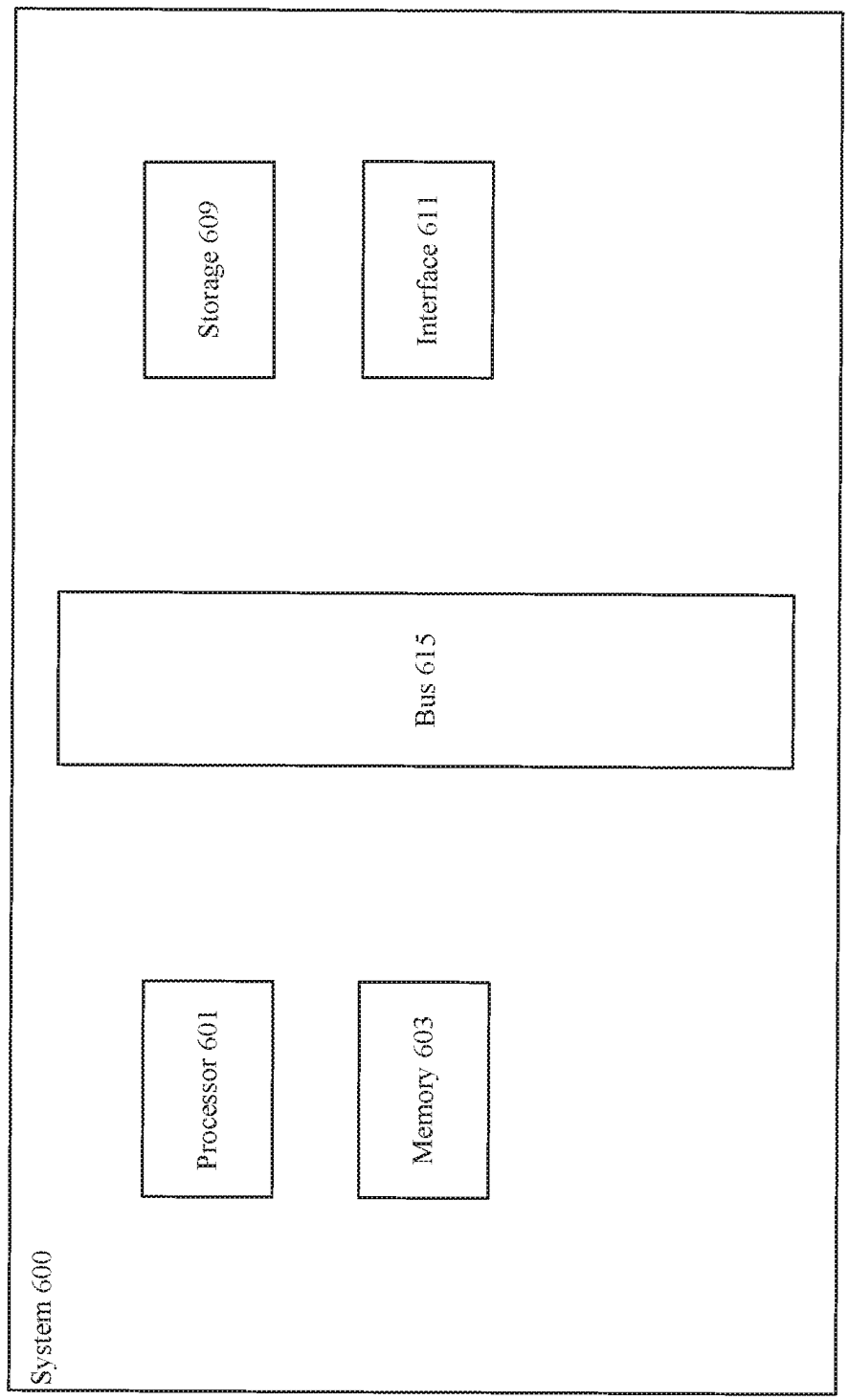
FIG. 6 illustrates one example of a system.

FIG. 6 illustrates one example of a server. According to particular embodiments, a system 600 suitable for implementing particular embodiments of the present invention includes a processor 601, a memory 603, a storage device 609, an interface 611, and a bus 615 (e.g., a PCI bus or other interconnection fabric) and operates as a streaming server. When acting wider the control of appropriate software or firmware, the processor 601 is responsible for modifying and transmitting live media data to a client. Various specially configured devices can also be used in place of a processor 601 or in addition to processor 601. The interface 611 is typically configured to send and receive data packets or data segments over a network. The storage device 609 may include one or more of a network attached storage (NAS), a storage area network (SAN) system, a local hard disc, or any other suitable component.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, EMI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 600 is a server that also includes a transceiver, streaming buffers, and a program guide database. The server may also be associated with subscription management, logging and report generation, and monitoring capabilities. In particular embodiments, the server can be associated with functionality for allowing operation with mobile devices such as cellular phones operating in a particular cellular network and providing subscription management capabilities. According to various embodiments, an authentication module verifies the identity of devices including mobile devices. A logging and report generation module tracks mobile device requests and associated responses. A monitor system allows an administrator to view usage patterns and system availability. According to various embodiments, the server handles requests and responses for media content related transactions while a separate streaming server provides the actual media streams.

Although a particular server is described, it should be recognized that a variety of alternative configurations are possible. For example, sonic modules such as a report and logging module and a monitor may not be needed on every server. Alternatively, the modules may be implemented on another device connected to the server. In another example, the server may not include an interface to an abstract buy engine and may in fact include the abstract buy engine itself. A variety of configurations are possible.

Figure 7:
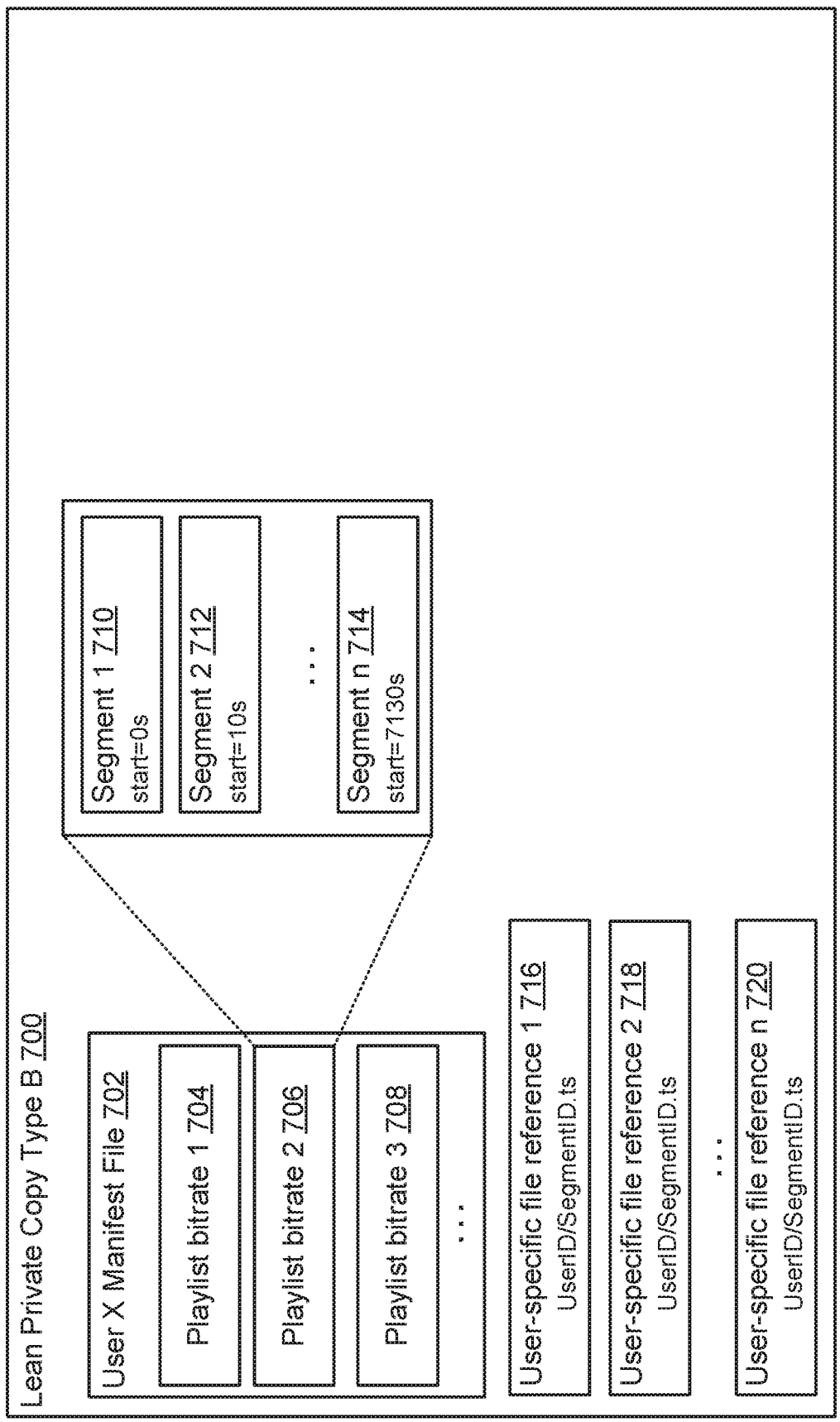
FIG. 7 illustrates an alternative example of a lean private copy.

FIG. 7 illustrates one example of a lean private copy type B 700 associated with a particular content management account that may be generated in accordance with techniques and mechanisms described herein. According to various embodiments, the lean private copy 700 may represent one or more media content items that have been recorded for later presentation by a particular user. As is discussed herein, the lean private copy type B 700 is specific to a particular content management account. Further, the lean private copy type B 700 is only one type of a lean private copy that may be provided in accordance with techniques and mechanisms described herein. Another example of a lean private copy is discussed with respect to FIG. 2.

In some implementations, the lean private copy 700 includes a user-specific manifest file 702 According to various embodiments, a media content item may be provided in a number of different formats. For example, a media content item may be provided in different bitrates, encoding formats, or other such characteristics. Each of these different formats may be described in the user-specific manifest file by a playlist. For example, the user X manifest file 702 shown in FIG. 7 includes playlists 704, 706, and 708 that each correspond with a different bitrate.

In some embodiments, each playlist may include a number of references to segments. For example, the playlist 706 includes the segment references 710, 712, and 714 that each correspond to a portion of the media content item.

In some implementations, each data segment reference may include information for retrieving a particular data segment from a media library. For instance, a data segment reference may include a uniform resource identifier (URI), segment identifier, or other such information that, when provided to the media library, causes the media library to return the requested segment. In this way, the lean private copy 700 may be used by a client machine to present the media content item at the client machine.

In particular embodiments, a lean private copy is specific to a particular content management account. For example, the lean private copy type B 700 shown in FIG. 7 includes user-specific file references 716, 718, and 720. Each of these file references is a user-specific link to a particular data segment. For example, the user-specific file reference 7 includes a local file path that itself includes several different components. According to various embodiments, these components include a user identifier, a segment identifier, and a file extension.

In some implementations, each user-specific file reference corresponds with a particular segment. For example, the user-specific file reference 2 718 corresponds with the segment 2 712, which is the second segment in the playlist 706.

In some embodiments, a user-specific file reference provides a user-specific link to a data segment that may be retrieved from a media library. For example, the actual data included in the segment corresponding with the user-specific file reference 2 770 may be stored on a server in a deduplicated fashion. Then, the user-specific file reference 7 770 may be used to retrieve the data segment for playback when the data segment corresponding with the file reference is retrieved from the media library.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A media server comprising:
a deduplication repository storing a plurality of media content items including a designated media content item, the designated media content item being stored as a plurality of media segments each encoding a respective time period of the designated media content item, each media segment being associated with a respective segment identifier;
a lean private copy repository storing a plurality of lean private copies of the designated media content item, each lean private copy being specific to a respective content management account and including a plurality of account-specific file references, each account-specific file reference including one of the segment identifiers, each lean private copy further including a user-specific manifest file dividing the media content item into a designated number of time periods, each time period including one or more reference identifiers that each identifies a respective one of the account-specific file references, each media segment being referenced by each of the lean private copies; and
a request processing engine including a processor, memory, and a communications interface, the request processing engine configured to receive from a client machine a request for the designated media content item, to determine a designated content management account associated with the request, to transmit to the client machine a selected one of the plurality of lean private copies that is associated with the designated content management account, and to transmit one or more of the data segments to the client machine upon receipt of the corresponding segment identifier.

2. The media server recited in claim 1, wherein determining a designated content management account associated with the request comprises:
identifying a content license associated with the request, the content license authorizing the designated content management account to access the content item.

3. The media server recited in claim 2, wherein the content license further includes authentication information verifying that the client machine has been authenticated as associated with the designated content management account.

4. The media server recited in claim 1, wherein the manifest file is configured in accordance with a format selected from the group consisting of: Hyptertext Transfer Protocol (HTTP) Live Streaming (HLS) and Dynamic Adaptive Streaming over HTTP (DASH).

5. The media server recited in claim 1, wherein the manifest file is configured in accordance with an adaptive bitrate streaming technology.

6. The media server recited in claim 1, wherein the media content item was previously-received by the media system via a live stream.

7. The media server recited in claim 1, wherein the media system further includes a content deduplication engine configured to receive a content stream associated with the media content item and to create the plurality of lean private copies.

8. The media server recited in claim 7, wherein the content deduplication engine is configured to transcode the content stream to create the plurality of data segments.

9. The media server recited in claim 1, wherein the media system provides network-based digital video recording services to a plurality of users.

10. A method comprising:
storing a plurality of media content items including a designated media content item in a deduplication repository, the designated media content item being stored as a plurality of media segments each encoding a respective time period of the designated media content item, each media segment being associated with a respective segment identifier;
storing a plurality of lean private copies of the designated media content item in a lean private copy repository, each lean private copy being specific to a respective content management account and including a plurality of account-specific file references, each account-specific file reference including one of the segment identifiers, each lean private copy further including a user-specific manifest file dividing the media content item into a designated number of time periods, each time period including one or more reference identifiers that each identifies a respective one of the account-specific file references, each media segment being referenced by each of the lean private copies;
receive from a client machine a request for the designated media content item;
determining a designated content management account associated with the request;
transmitting to the client machine a selected one of the plurality of lean private copies that is associated with the designated content management account; and
transmitting one or more of the data segments to the client machine upon receipt of the corresponding segment identifier.

11. The method recited in claim 10, wherein determining a designated content management account associated with the request comprises:
identifying a content license associated with the request, the content license authorizing the designated content management account to access the content item.

12. The method recited in claim 11, wherein the content license further includes authentication information verifying that the client machine has been authenticated as associated with the designated content management account.

13. The method recited in claim 10, wherein the manifest file is configured in accordance with a format selected from the group consisting of: Hypertext Transfer Protocol (HTTP) Live Streaming (HLS) and Dynamic Adaptive Streaming over HTTP (DASH).

14. The method recited in claim 10, wherein the manifest file is configured in accordance with an adaptive bitrate streaming technology.

15. The method recited in claim 10, wherein the media content item was previously-received by the media system via a live stream.

16. The method recited in claim 10, wherein the media system further includes a content deduplication engine configured to receive a content stream associated with the media content item and to create the plurality of lean private copies.

17. One or more non-transitory computer readable media having instructions stored thereon for performing a method, the method comprising:
storing a plurality of media content items including a designated media content item in a deduplication repository, the designated media content item being stored as a plurality of media segments each encoding a respective time period of the designated media content item, each media segment being associated with a respective segment identifier;

storing a plurality of lean private copies of the designated media content item in a lean private copy repository, each lean private copy being specific to a respective content management account and including a plurality of account-specific file references, each account-specific file reference including one of the segment identifiers, each lean private copy further including a user-specific manifest file dividing the media content item into a designated number of time periods, each time period including one or more reference identifiers that each identifies a respective one of the account-specific file references, each media segment being referenced by each of the lean private copies;

receive from a client machine a request for the designated media content item;

determining a designated content management account associated with the request;

transmitting to the client machine a selected one of the plurality of lean private copies that is associated with the designated content management account; and transmitting one or more of the data segments to the client machine upon receipt of the corresponding segment identifier.

18. The one or more non-transitory computer readable media recited in claim 17, wherein determining a designated content management account associated with the request comprises:

identifying a content license associated with the request, the content license authorizing the designated content management account to access the content item.

19. The one or more non-transitory computer readable media recited in claim 18, wherein the content license further includes authentication information verifying that the client machine has been authenticated as associated with the designated content management account.

20. The one or more non-transitory computer readable media recited in claim 17, wherein the manifest file is configured in accordance with a format selected from the group consisting of: Hyptertext Transfer Protocol (HTTP) Live Streaming (HLS) and Dynamic Adaptive Streaming over HTTP (DASH).

* * * * *